United States Patent
Kovalenko et al.

(10) Patent No.: US 12,032,871 B2
(45) Date of Patent: Jul. 9, 2024

(54) AUDIO ROUTING DETERMINATION FOR SPEAKER DEVICES

(71) Applicant: Motorola Mobility LLC, Chicago, IL (US)

(72) Inventors: Igor Kovalenko, Palatine, IL (US); Vishwanath KM, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 413 days.

(21) Appl. No.: 17/176,778

(22) Filed: Feb. 16, 2021

(65) Prior Publication Data

US 2022/0261210 A1 Aug. 18, 2022

(51) Int. Cl.
*G06F 3/16* (2006.01)
*H04R 3/12* (2006.01)

(52) U.S. Cl.
CPC ............. *G06F 3/165* (2013.01); *H04R 3/12* (2013.01); *H04R 2420/01* (2013.01); *H04R 2420/07* (2013.01)

(58) Field of Classification Search
CPC ....... G06F 3/165; H04R 3/12; H04R 2420/01; H04R 2420/07
See application file for complete search history.

(56) References Cited

U.S. PATENT DOCUMENTS

| 2006/0189301 A1* | 8/2006 | Vander Veen .... H04M 1/72403 455/414.1 |
| 2010/0057233 A1* | 3/2010 | Suzuki .............. H04W 52/0241 700/94 |
| 2023/0229385 A1 | 7/2023 | Kovalenko et al. |
| 2023/0236793 A1 | 7/2023 | Kovalenko et al. |

FOREIGN PATENT DOCUMENTS

WO WO-2015159130 A1 * 10/2015 .......... H04M 1/6066

* cited by examiner

*Primary Examiner* — Joseph Saunders, Jr.
(74) *Attorney, Agent, or Firm* — FIG. 1 Patents

(57) ABSTRACT

When a speaker device is within communication range of an electronic device, various rules are used to determine whether to connect to or route audio data to the speaker device. For example, the electronic device may prompt the user to choose whether to connect to a wireless speaker device. In situations in which the user rejects connecting to the wireless speaker device, subsequent attempts by the speaker device to connect to the electronic device are also rejected or ignored without further prompting the user, or the wireless speaker device may be connected to the electronic device but audio data not routed to the wireless speaker device. By way of another example, the electronic device may determine whether to route audio data to a wireless speaker device based on signal strength and link quality metrics for wireless communication between the electronic device and one or more wireless speaker devices.

20 Claims, 8 Drawing Sheets

AUDIO ROUTING DETERMINATION FOR SPEAKER DEVICES

BACKGROUND

As technology has advanced our uses for computers have expanded. One such use is wirelessly communicating with multiple devices. For example, a computer may wirelessly communicate with different speakers at different times to play back audio data. However, this wireless communication is not without its problems. One such problem is that connections to wireless devices are oftentimes made automatically. Such connections can result in situations in which wireless devices are automatically connected to a computer contrary to the desires of the user of the computer. These problems can be frustrating for users, leading to user frustration with their computers and wireless devices.

BRIEF DESCRIPTION OF THE DRAWINGS

Embodiments of audio routing determination for speaker devices are described with reference to the following drawings. The same numbers are used throughout the drawings to reference like features and components.

DETAILED DESCRIPTION

Figure 1:
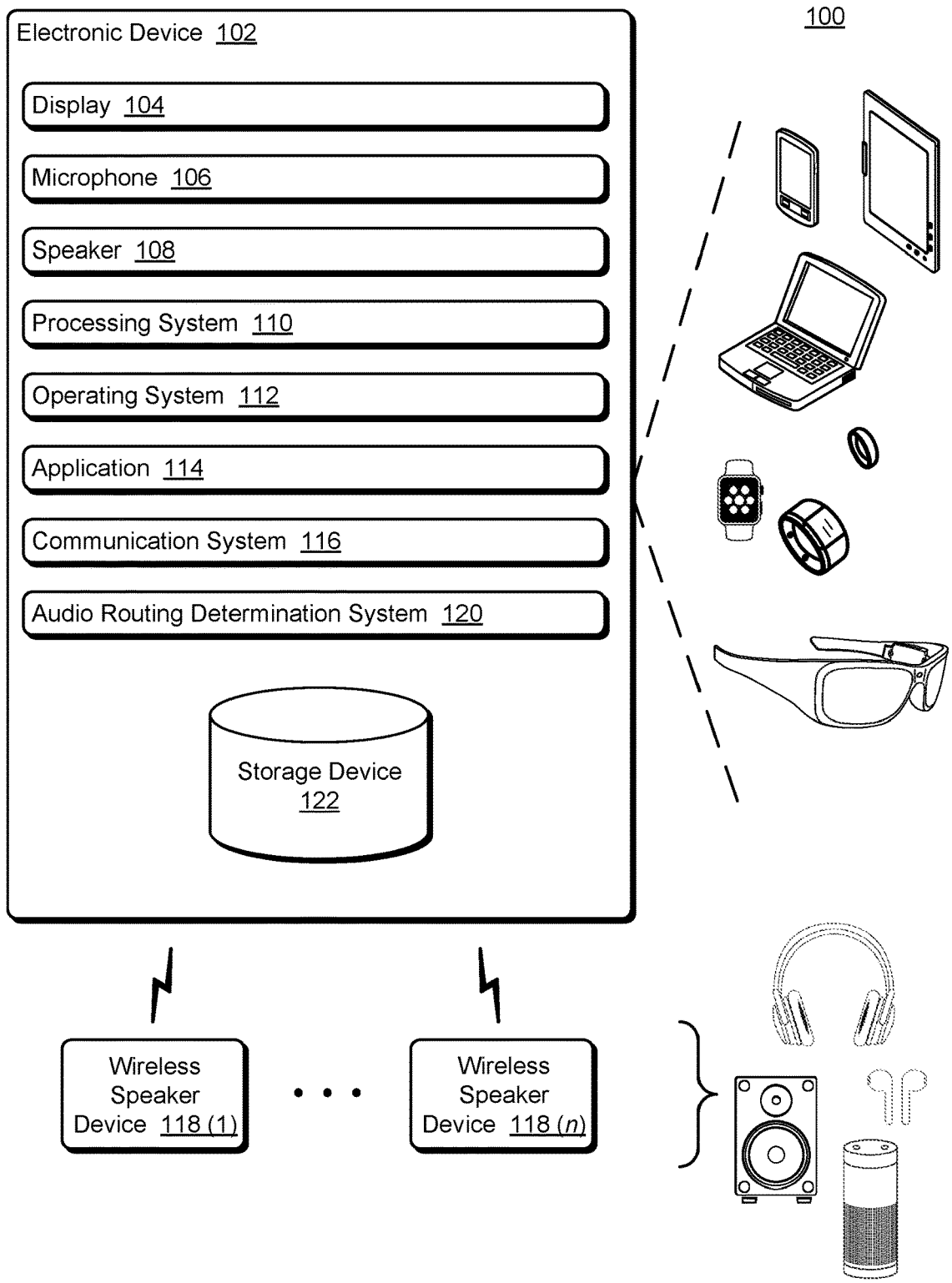
FIG. 1 illustrates an example system including an electronic device implementing the techniques discussed herein.

Audio routing determination for speaker devices is discussed herein. Generally, an electronic device is able to connect to multiple different speaker devices at different times. When a wireless speaker device is within communication range of the electronic device, various rules are used to determine whether to connect to the wireless speaker device. For example, if a wireless speaker device comes within range of the electronic device (and optionally if audio playback on the electronic device is currently active (e.g., the user is in a phone call and playing back audio on the internal speaker of the electronic device)), various rules are applied to determine whether to route the audio data to the wireless speaker device or to continue routing the audio data to the internal speaker of the electronic device.

When a wireless speaker device comes within wireless communication range of the electronic device, a connection request is made (e.g., by the wireless speaker device). In one or more embodiments, in response to the connection request the rules include prompting the user to choose whether to connect to the wireless speaker device. This gives the user control over whether to change to routing audio data to the wireless speaker device. In situations in which the user chooses not to route audio data to the wireless speaker device by rejecting the connection, the connection request is ignored and a record of this rejection is optionally maintained. In some situations, the wireless speaker device again requests to connect to the electronic device (e.g., within a threshold amount of time of the rejection), the user rejection is remembered and the connection request is ignored by the electronic device without further prompting the user to choose whether to connect to the wireless speaker device. Additionally or alternatively, in situations in which the user chooses not to route audio data to the wireless speaker device, the electronic device connects to the wireless speaker device but does not route audio data to the wireless speaker device. Accordingly, additional connection requests are not received from the wireless speaker device and the electronic device need not manage or respond to additional connection requests from the wireless speaker device.

Additionally or alternatively, in response to the connection request the rules include automatically connecting to the wireless speaker device and determining whether to route audio data to the wireless speaker device based on signal strength and link quality metrics. For example, if an electronic device is currently routing audio data to a wireless headphone device and an additional wireless speaker device (e.g., a car stereo) comes within wireless range of the electronic device, the electronic device automatically determines whether to change to routing audio data to the additional wireless speaker device based at least in part on signal strength and link quality metrics between the electronic device and the additional wireless speaker device. This determination can further be based on signal strength and link quality metrics between the electronic device and the wireless headphone device that audio data is being routed to.

In contrast to techniques that automatically connect to and route data to a wireless speaker device that comes within wireless communication range of the electronic device, the techniques discussed herein employ various rules to determine whether to connect to or route data to the wireless speaker device. For example, if a wireless speaker device (e.g., car stereo) has been previously paired with the electronic device and comes within wireless communication range of the electronic device (optionally while audio data is being routed to an internal speaker of the electronic device), the user is prompted to choose whether to route audio data to the wireless speaker device. Thus, for example, if the user is on a work phone call in his home office and his son drives up in a car with a stereo paired to the user's electronic device, this avoids the situation where the audio data for the work phone call is routed to the car stereo without the user's consent.

By way of another example, if two different wireless speaker devices have been previously paired with the electronic device, which of the two wireless speaker devices the electronic device is to route audio data to varies based on the signal strength and link quality metrics of the wireless communication channels between the electronic device and the two wireless speaker devices, or based on user input to a connection prompt indicating whether the electronic device is to connect to (or route audio data to) one of the wireless speaker devices.

The techniques discussed herein improve the operation of an electronic device by routing audio data to an appropriate one of multiple speaker devices. This allows the electronic device to be configured appropriately based on a given environment or situation, avoiding situations where audio data is routed to inappropriate speaker devices.

FIG. 1 illustrates an example system 100 including an electronic device 102 implementing the techniques discussed herein. The electronic device 102 can be, or include, many different types of electronic or computing devices. For example, the electronic device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The electronic device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of and internal to the electronic device 102, it should be noted that one or more of the display 104, the microphone 106, and the speaker 108 can be implemented separately from the electronic device 102. In such situations, the electronic device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the electronic device 102 and the electronic device 102 (e.g., a streaming media player) communicates with the display 104 via an HDMI cable. By way of another example, the microphone 106 may be separate from the electronic device 102 (e.g., the electronic device 102 may be a television and the microphone 106 may be implemented in a remote control device) and voice inputs received by the microphone 106 are communicated to the electronic device 102 via an IR or radio frequency wireless connection.

The electronic device 102 also includes a processing system 110 that includes one or more processors, each of which can include one or more cores. The processing system 110 is coupled with, and may implement functionalities of, any other components or modules of the electronic device 102 that are described herein. In one or more embodiments, the processing system 110 includes a single processor having a single core. Alternatively, the processing system 110 includes a single processor having multiple cores or multiple processors (each having one or more cores).

The electronic device 102 also includes an operating system 112. The operating system 112 manages hardware, software, and firmware resources in the electronic device 102. The operating system 112 manages one or more applications 114 running on the electronic device 102 and operates as an interface between applications 114 and hardware components of the electronic device 102.

The electronic device 102 also includes a communication system 116. The communication system 116 manages communication with various other wireless speaker devices 118(1), . . . , 118(n), including communicating audio data to the wireless speaker devices 118 for playback by the wireless speaker devices 118. The wireless speaker devices 118 include any of a variety of devices capable of playing back audio data, including standalone or dedicated speaker devices (e.g., headphones, ear pods, bookshelf speakers, portable Bluetooth™ speakers, and so forth) as well as speaker devices incorporated into other electronic devices (e.g., smart speakers, stereos such as stereos, and so forth). Wireless communication channels can be established between the electronic device 102 and each of the wireless speaker devices 118, each communication channel having different signal strengths and link quality metrics that vary based on multiple factors, such as distance between the electronic device 102 and the wireless speaker device 118, transmitting power of the electronic device 102 and the wireless speaker device 118, other devices communicating at the same or close frequencies as the electronic device 102 and the wireless speaker device 118, physical obstructions between the electronic device 102 and the wireless speaker device 118, and so forth. In one or more embodiments, the communication system 116 communicates wirelessly with the wireless speaker devices 118, such as communicating using Bluetooth™ standards.

The electronic device 102 also includes an audio routing determination system 120. The audio routing determination system 120 determines which of wireless speaker devices 118 to connect to and route audio data to for playback. This audio data can be generated by, for example, an application 114 or the operating system 112. The audio routing determination system 120 determines which of wireless speaker devices 118 to connect to and route audio data to for playback based on various rules, such as user inputs to displayed connection prompts, signal strength and link quality metrics for the wireless communication channels between the electronic device 102 and the wireless speaker devices 118, and so forth as discussed in more detail below.

The audio routing determination system 120 can be implemented in a variety of different manners. For example, the audio routing determination system 120 can be implemented as multiple instructions stored on computer-readable storage media and that can be executed by the processing system 110. Additionally or alternatively, the audio routing determination system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The electronic device 102 also includes a storage device 122. The storage device 122 can be implemented using any of a variety of storage technologies, such as magnetic disk, optical disc, Flash or other solid state memory, and so forth. The storage device 122 can store various program instructions and data for any one or more of the operating system 112, application 114, and the audio routing determination system 120. For example, the storage device 122 can store a record of connection requests that have been rejected by the user of the electronic device 102 as discussed in more detail below.

Figure 2:
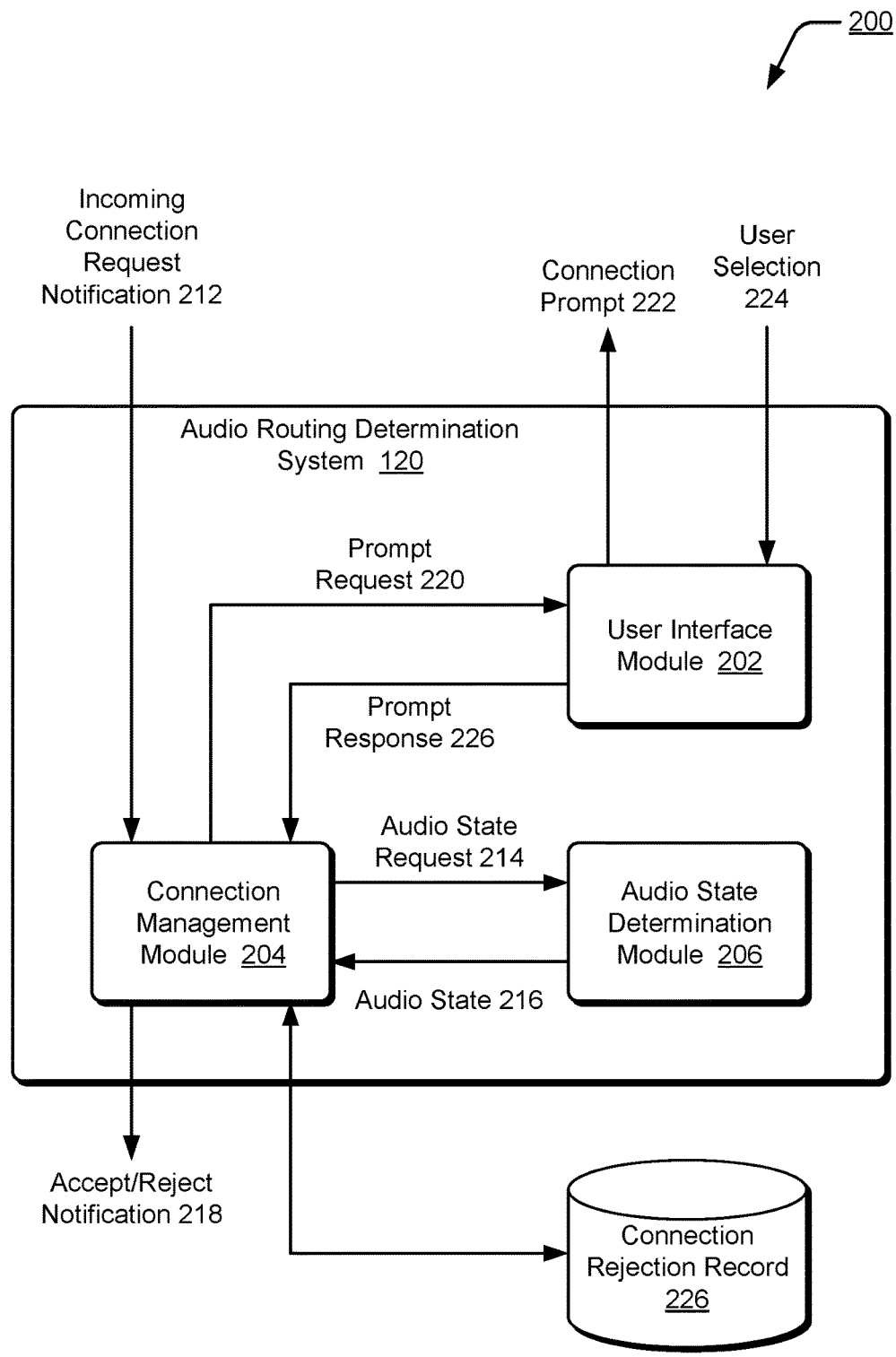
FIG. 2 illustrates an example system implementing the techniques discussed herein.

FIG. 2 illustrates an example system 200 implementing the techniques discussed herein. The example system 200 includes an audio routing determination system 120, which includes a user interface module 202, a connection management module 204, and an audio state determination module 206.

The connection management module 204 receives an incoming connection request notification 212. The incoming connection request notification 212 indicates that a request to connect a wireless speaker device 118 to the electronic device 102 has been made. This request can have been initiated by the wireless speaker device 118 or the electronic device 102. The incoming connection request notification 212 is received from, for example, an application 114 or the operating system 112.

It should be noted that the incoming connection request notification 212 is for a wireless speaker device that has previously been paired with the electronic device 102. Pairing two devices (e.g., in accordance with the Bluetooth™ standards) refers to establishing permission or authorization for the two devices to communicate with one another. Pairing typically involves user input, such as selecting a pairing mode on one or more of the devices, entering into one device a personal identification number (PIN) displayed by the other device, and so forth. After the electronic device 102 and a wireless speaker device are paired they can be connected to allow audio data to be communicated from the electronic device 102 to the wireless speaker device. This connection is traditionally established automatically when the two devices are within wireless communication range of one another. However, as discussed in more detail below, using the techniques discussed herein certain situations arise in which the connection is not performed automatically.

In one or more embodiments, the connection management module 204 communicates an audio state request 214 to the audio state determination module 206. The audio state determination module 206 determines an audio state for the electronic device 102 indicating whether audio playback at the electronic device 102 is currently active. The audio state determination module 206 can determine whether audio playback at the electronic device 102 is currently active in various manners, such as whether the electronic device 102 is currently in a phone call with another device (e.g., via a cellular network or via the Internet) as indicated by an application 114 or the operating system 112, whether the electronic device 102 is currently playing back music or videos (e.g., a music playback application or a video playback application is currently active or currently in the foreground) as indicated by an application 114 or the operating system 112, and so forth.

The audio state determination module 206 returns the current audio state to the connection management module 204 as audio state 216. In one or more embodiments, the connection management module 204 proceeds based on whether the audio state 216 indicates that audio playback at the electronic device 102 is currently active. For example, the connection management module 204 can automatically accept the connection request and connect to the wireless speaker device in response to the audio state 216 indicating that audio playback at the electronic device 102 is not currently active. However, if audio playback at the electronic device 102 is currently active one or more rules are used to determine whether to accept the connection request and connect to the wireless speaker device, such as a user response to a connection prompt, signal strength and link quality metrics between the electronic device 102 and the wireless speaker device, and so forth.

In one or more embodiments, the connection management module 204 provides a notification 218 indicating whether the connection request is to be accepted or rejected. This notification 218 is provided to, for example, the operating system 112 or the communication system 116 to indicate whether to establish the requested connection to the wireless speaker device. In response to notification 218 indicating to accept the connection request, the communication system 116 establishes the requested connection to the wireless speaker device. In response to notification 218 indicating to reject the request, the communication system 116 does not establish the requested connection to the wireless speaker device, optionally providing a message or other notification to the wireless speaker device that the connection request has been rejected. Additionally or alternatively, the notification 218 may indicate to ignore the connection request, in response to which the communication system 116 does not establish the requested connection to the wireless speaker device and does not provide a message or other notification to the wireless speaker device that the connection request has been rejected.

In one or more embodiments, the connection management module 204 determines whether to accept the connection request and connect to the wireless speaker device based on user response to a connection prompt. The connection management module 204 communicates a prompt request 220 to user interface module 202. The user interface module 202 displays a connection prompt 222 that prompts the user to select whether to connect to the wireless speaker device. A user selection 224 is received in response to the connection prompt 222, which is returned to the connection management module 204. Thus, in such situations the user maintains control over whether the electronic device 102 connects to the wireless speaker device.

Figure 3:
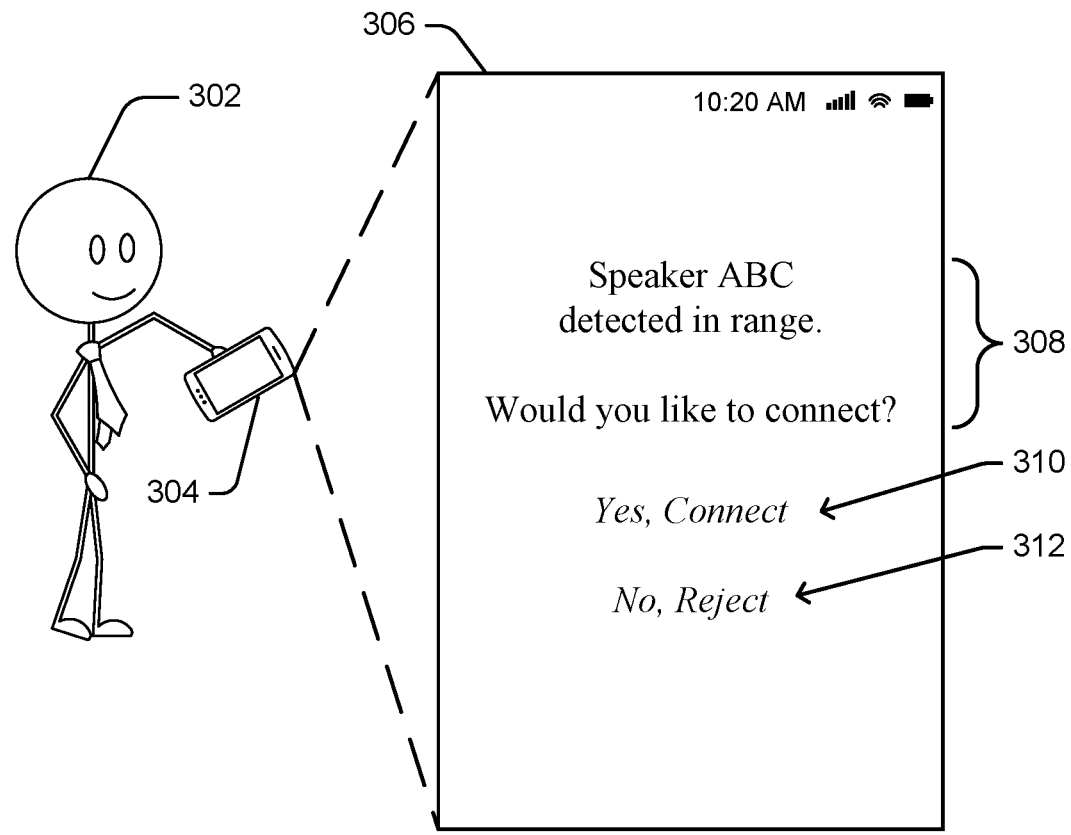
FIG. 3 illustrates an example presentation of a connection prompt to the user.

FIG. 3 illustrates an example presentation of a connection prompt to the user. As illustrated, a user 302 has an electronic device 304, illustrated as a smartphone. On the display 306 of the electronic device 304 a connection prompt 308 is presented, identifying the wireless speaker device and querying the user 302 whether the electronic device 304 is to connect to the wireless speaker device. User interface elements 310 and 312 (e.g., links, buttons, etc.) are displayed allowing the user 302 to provide user input that is a selection to connect to the wireless speaker device, or to reject the connection request and not connect to the wireless speaker device. Additionally or alternatively the connection prompt is presented to the user in other manners, such as audibly, haptically to notify the user that connection prompt 308 has been displayed, and so forth.

In one or more embodiments, the connection prompt 308 and user interface elements 310 and 312 are displayed for a threshold amount of time, such as 15 or 20 seconds. This threshold amount of time is selected to be an amount of time that gives the user 302 sufficient opportunity to select one of the user interface elements 310 and 312 while also not displaying the user interface elements 310 and 312 so long that they may interfere with the user of the electronic device 304 by the user 302. If a user selection of one of the user interface elements 310 and 312 is not received within the threshold amount of time, the user interface module 202 ceases displaying the user interface elements 310 and 312 and proceeds presuming that a user selection 224 of ignoring the connection prompt 308 (or alternatively rejecting the connection prompt 308) was made. Thus, a user not responding to the connection prompt can be treated as an inherent user selection to ignore the connection request.

Returning to FIG. 2, in one or more embodiments, the audio routing determination system 120 also maintains a connection rejection record 226, such as in the storage device 122 of FIG. 1. The connection rejection record 226 is a record of wireless speaker devices for which the connection request is rejected, allowing subsequent connection requests from the wireless speaker device to be ignored by the electronic device 102 without providing additional connection prompts 222 to the user. It should be noted that this connection rejection record 226 is temporary and is automatically cleared or removed in response to one or more events as discussed in more detail below.

Figure 4:
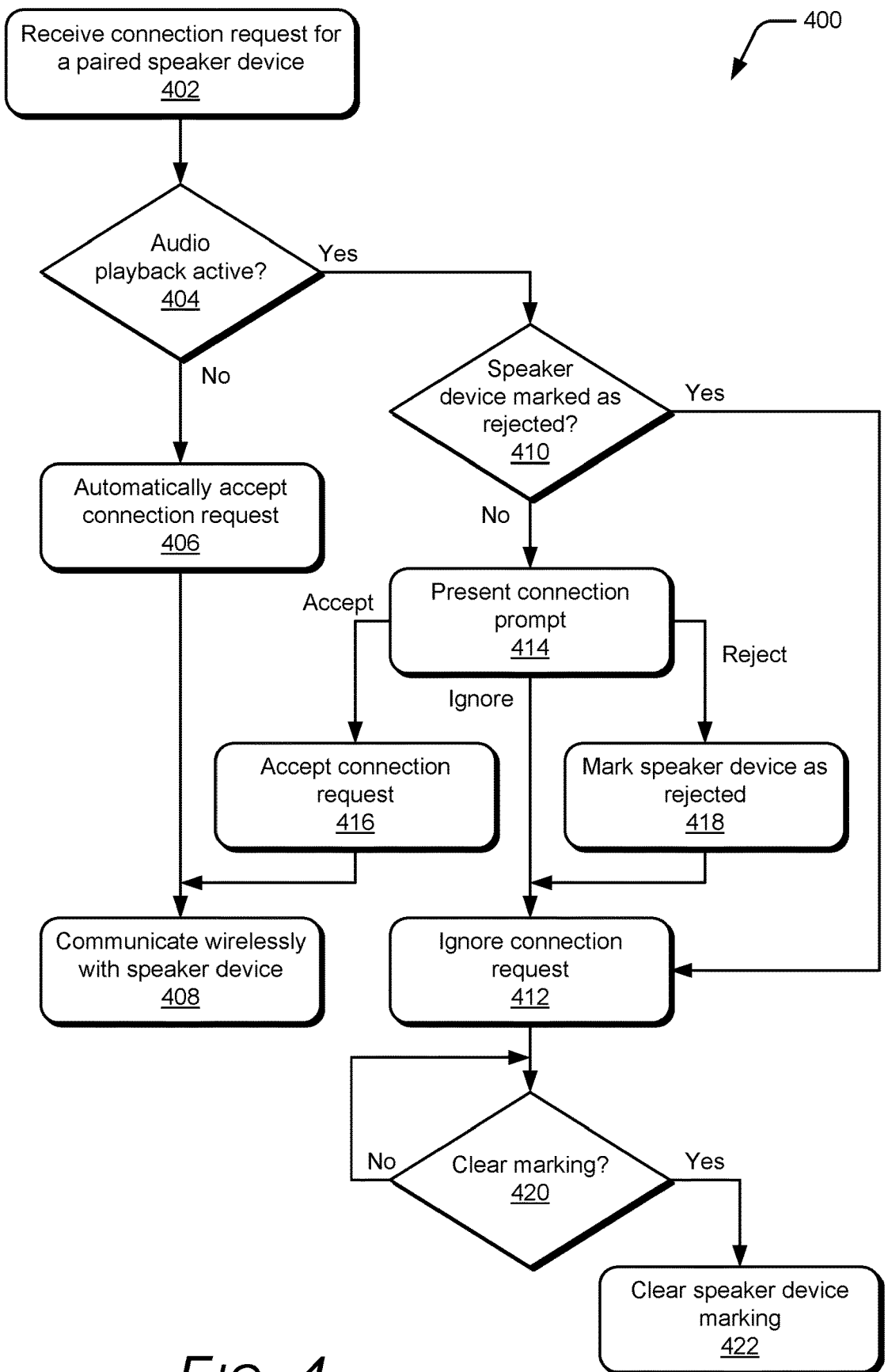
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by a system of an electronic device, such as audio routing determination system 120 of FIG. 1 or FIG. 2, and can be implemented in software, firmware, hardware, or combinations thereof. Process 400 is shown as a set of acts and is not limited to the order shown for performing the operations of the various acts.

In process 400, a connection request for a paired speaker device is received (act 402). The request to connect can have been initiated by either the electronic device or the paired speaker device. In one or more embodiments, the speaker device has been previously paired with the electronic device.

In response to the connection request, a determination is made as to whether audio playback on the electronic device is active (act 404). This determination can be made in various manners as discussed above, such as determining whether the electronic device is currently in a phone call with another device, determining whether the electronic device is currently playing back music or videos, and so forth.

In response to audio playback on the electronic device not being active, the connection request is automatically accepted (act 406). This acceptance includes establishing a communication channel between the electronic device and the speaker device. The connection request can be automatically accepted because there is no risk of audio the user is listening to being automatically switched from one speaker device to another because the user is not currently listening to any audio from the electronic device.

The electronic device proceeds to communicate wirelessly with the speaker device (act 408). This communication includes routing audio data for audio playback from the electronic device to the speaker device. The electronic device continues to communicate wirelessly with the speaker device in act 408 until any of various connection termination events occur, such as audio data being routed to a different speaker device, the speaker device or electronic device being powered off, one or both of the speaker device and the electronic device being moved so as to no longer be in wireless communication range, the speaker device being disconnected from the electronic device, and so forth.

Returning to act 404, in response to audio playback on the electronic device being active, a check is made as to whether the speaker device is marked as rejected (act 410). If a connection request for the speaker device was previously received and rejected, the speaker device is marked as rejected and a record of that rejection is maintained as discussed in more detail below.

If the speaker device is marked as rejected, then the connection request is ignored (act 412). Ignoring the connection request includes not establishing the requested connection to the wireless speaker device and not establishing a communication channel between the electronic device and the wireless speaker device. Typically a message or other notification is not provided to the wireless speaker device that the connection request has been rejected. Ignoring the connection request for a speaker device that was previously rejected avoids the situation where the user is repeatedly prompted to connect to the speaker device despite having indicated (explicitly or inherently) that he does not desire to connect to the speaker device.

However, if the speaker device is not marked as rejected then a connection prompt is displayed or otherwise presented (act 414). The connection prompt identifies the speaker device and allows the user to select whether to accept or reject the connection request for the speaker device. The user selection can be made in any of a variety of different manners, such as selection of a displayed button or link, input of a gesture (e.g., on a touchscreen display), voice input, and so forth.

In response to user input selecting to accept the connection request, the connection request is accepted (act 416). This acceptance includes establishing a communication channel between the electronic device and the speaker device.

The electronic device proceeds to communicate wirelessly with the speaker device (act 408). This communication includes routing audio data for audio playback from the electronic device to the speaker device. In one or more embodiments, the electronic device ceases routing audio data to other speaker devices (e.g., a speaker device to which audio data was being routed when the connection request was received in act 402). Furthermore, if the electronic device was previously connected to another speaker device, the wireless communication channel between the electronic device and that other speaker device is terminated.

For example, if audio data is being routed to an internal speaker of the electronic device at the time the connection request is received for the wireless speaker device, in response to user input selecting to accept the connection request audio data is routed to the wireless speaker device rather than the internal speaker. By way of another example, if audio data is being routed to a first wireless speaker device (e.g., headphones) at the time the connection request is received for a second wireless speaker device (e.g., a car stereo), in response to user input selecting to accept the connection request audio data is routed to the second wireless speaker device rather than the first wireless speaker device.

Returning to act 414, in response to user input selecting to reject the connection request, the speaker device is marked as rejected (act 418). This marking allows subsequent connection requests from the speaker device to be ignored in act 410 as discussed above. Additionally, the connection request is ignored (act 412). Although a rejection notification is not typically communicated to the speaker device in response to the user input selecting to reject the connection request, additionally or alternatively the does communicate a rejection notification or message is to the speaker device in response to user input selecting to reject the connection request.

In act 414, in response to the user ignoring the connection prompt (e.g., the user selecting to neither accept nor reject the connection request), the connection request is ignored (act 412). Additionally or alternatively, the connection prompt presented in act 414 may include an "ignore" option that can be selected by the user. In such situations, the connection request is ignored in act 412 but is not marked as rejected in act 418.

Although the user ignoring the connection prompt is discussed above as not marking the speaker device as rejected, additionally or alternatively the speaker device is marked as rejected if the connection prompt is ignored. This allows the audio routing determination system to treat a connection request being ignored in the same manner as a connection request being rejected.

Additionally or alternatively, in response to the user ignoring the connection prompt the speaker device is marked as ignored. This marking can be maintained analogous to maintaining the connection rejection record but allows the audio routing determination system to treat ignored connection requests differently than rejected connection requests. For example, the audio routing determination system may use different conditions to determine when to clear a marking for a speaker device, such as waiting a longer amount of time to clear a rejection marking than to clear an ignored marking (e.g., because by rejecting the connection request the user has explicitly indicated that he is not interested in connecting to that speaker device).

In situations in which the connection request is rejected, a check is made as to whether to clear the marking of rejected (act 420). The marking of rejected can be cleared in response to any of a variety of different events.

In one or more embodiments, such an event is audio playback no longer being active (e.g., the application that resulted in a determination of audio playback being active (in act 404) being no longer currently active (e.g., phone call ends, music or video playback application is closed, halted, or no longer in the foreground, and so forth)). Additionally or alternatively, such an event is a threshold amount of time elapses since the connection request was rejected. This threshold amount of time is an amount of time that is longer than audio playback being currently active is anticipated to take, such as 3 hours for a phone call, 12 hours for audio or video playback, and so forth. Additionally or alternatively, such an event is a threshold amount of time elapses since a connection request was received from the speaker device. Additionally or alternatively, such an event is connection requests not being received from the speaker device, indicating that the speaker device has been powered down or is no longer within wireless communication range of the electronic device. Additionally or alternatively, such an event is the speaker device being disconnected from the electronic device (e.g., if the speaker device were to have been subsequently connected to the electronic device after the connection request was initially rejected).

Additionally or alternatively, in some situations a connection request may be marked and the marking of ignored can be cleared in response to any of a variety of different events analogous to clearing the marking of rejected. Different criteria are optionally used to determine events that cause the marking of ignored to be removed than cause the marking of rejected to be removed. For example, such an event can be a first threshold amount of time elapsing since the connection request was rejected and a second threshold amount of time (shorter than the first threshold amount of time) elapsing since the connection request was ignored.

In one or more embodiments, such an event is the application that resulted in a determination of audio playback being active (in act 404) being no longer currently active (e.g., phone call ends, music or video playback application is closed, halted, or no longer in the foreground, and so forth). Additionally or alternatively, such an event is a threshold amount of time elapses since the connection request was rejected (or optionally ignored). This threshold amount of time is an amount of time that is longer than audio playback being currently active is anticipated to take, such as 3 hours for a phone call, 12 hours for audio or video playback, and so forth. Additionally or alternatively, such an event is connection requests not being received from the speaker device, indicating that the speaker device has been powered down or is no longer within wireless communication range of the electronic device. Additionally or alternatively, such an event is the speaker device being disconnected from the electronic device (e.g., if the speaker device were to have been subsequently connected to the electronic device after the connection request was initially rejected (or ignored)).

In response to determining that the marking of rejected is to be cleared, the marking is of rejected is cleared (act 422).

Figure 5A:
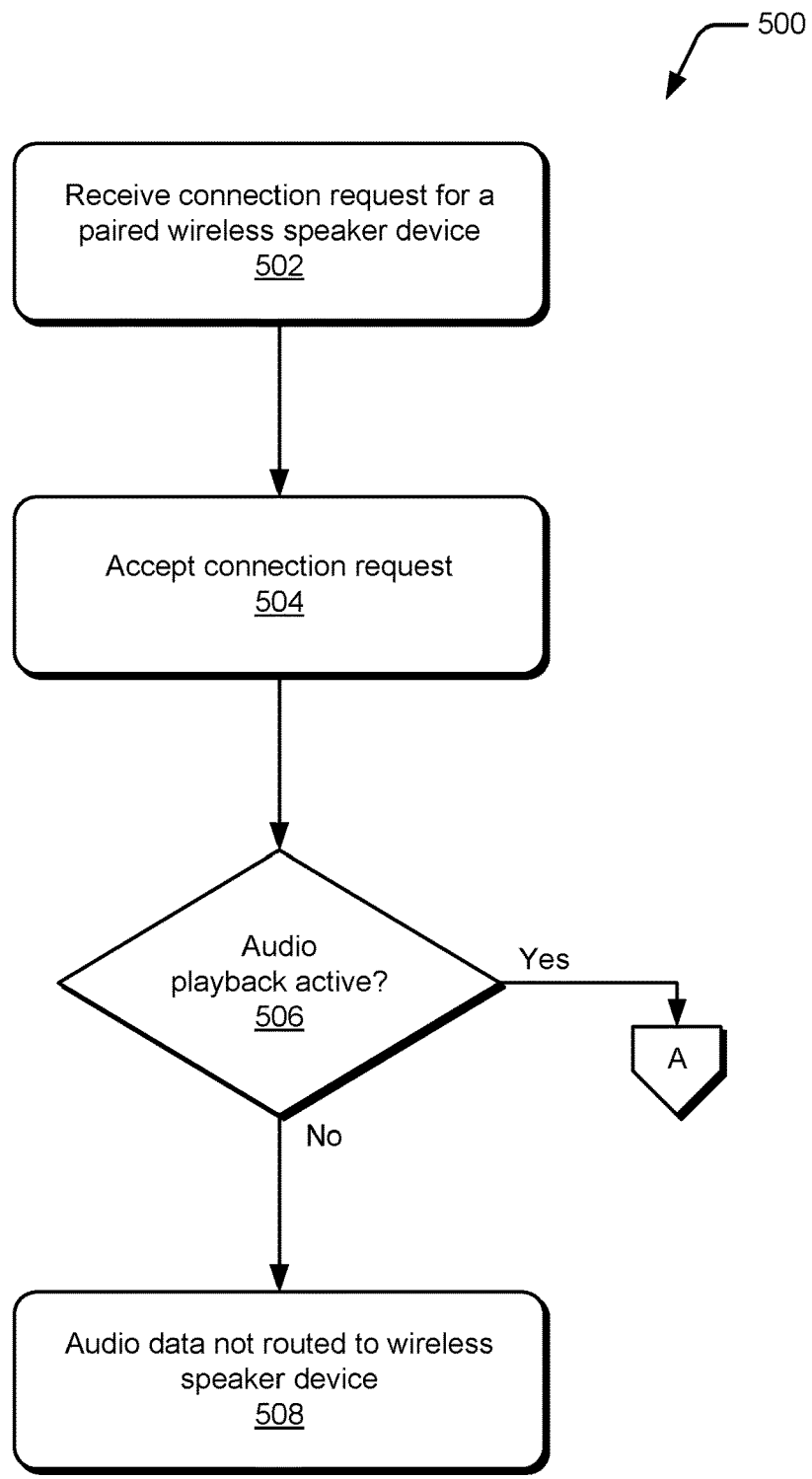
FIGS. 5A and 5B illustrate another example process for implementing the techniques discussed herein in accordance with one or more embodiments.
Figure 5B:
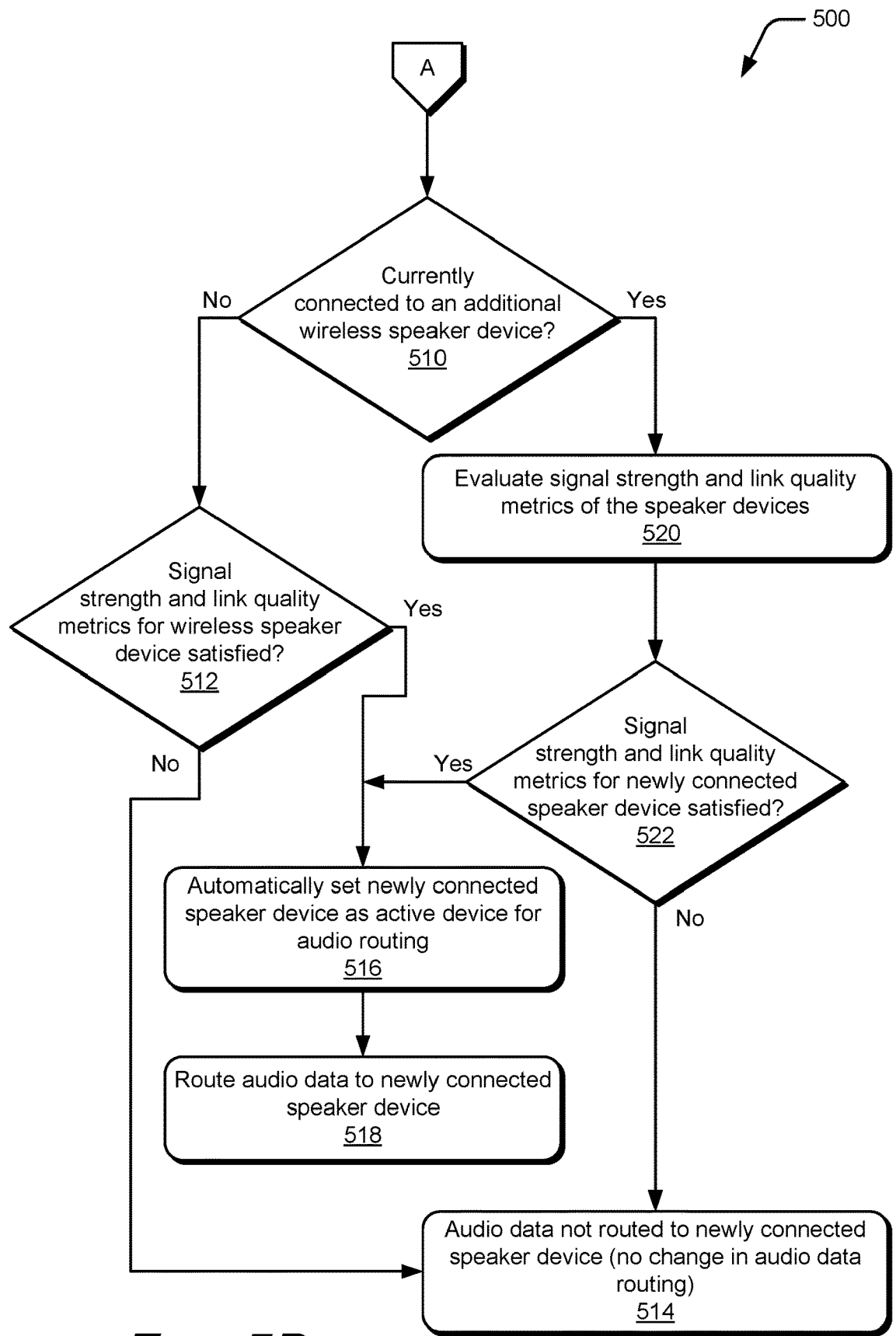

FIGS. 5A and 5B illustrate an example process 500 for implementing the techniques discussed herein in accordance with one or more embodiments. Process 500 is carried out by a system of an electronic device, such as audio routing determination system 120 of FIG. 1 or FIG. 2, and can be implemented in software, firmware, hardware, or combinations thereof. Process 500 is shown as a set of acts and is not limited to the order shown for performing the operations of the various acts.

In process 500, a connection request for a paired wireless speaker device is received (act 502). The request to connect can have been initiated by either the electronic device or the speaker device. In one or more embodiments, the wireless speaker device has been previously paired with the electronic device.

The connection request is accepted (act 504), for example automatically. This acceptance includes establishing a communication channel between the electronic device and the wireless speaker device.

In response to the connection request for the wireless speaker device, a determination is made as to whether audio playback on the electronic device is active (act 506). This determination can be made in various manners as discussed above, such as determining whether the electronic device is currently in a phone call with another device, determining whether the electronic device is currently playing back music or videos, and so forth.

In response to audio playback on the electronic device not being active, audio data is not routed to the wireless speaker device (act 508). As there is no audio being played back by the electronic device, there is no audio data to route to the wireless speaker device for playback.

However, in response to audio playback on the electronic device being active, a check is made as to whether the electronic device is currently connected to an additional wireless speaker device (act 510). In one or more embodiments, this check in act 510 is a check as to whether the electronic device is currently connected to any previously paired wireless speaker device that is set as the active device to which audio data is routed. Additionally or alternatively, the speaker device may be another speaker device, such as an internal speaker device of the electronic device.

In response to determining that the electronic device is not currently connected to an additional wireless speaker device, a determination is made as to whether signal strength and link quality metrics for the wireless speaker device are satisfied (act 512). This determination is made for the wireless speaker device for which the connection request was received in act 502. In one or more embodiments, the signal strength refers to a received signal strength indicator (RSSI) value, which is a measure of the power level of the wireless signal at the electronic device. The signal strength value is satisfied, for example, if the RSSI value is greater than a threshold amount, such as −20 or −30 decibels (dBm).

In one or more embodiments, the link quality metrics are an indication of the quality of the wireless communication channel regardless of the RSSI value. The link quality metrics can include any of a variety of metrics, for example, a percentage of the wireless signal received, a number of dropped packets or other missed data, a link quality indicator (LQI) value, and so forth. The link quality metrics are satisfied, for example, it the quality of the wireless communication channel is satisfies a threshold amount, such as at least 80% of the wireless signal is received, fewer than 10% of the packets or other data are dropped, an LQI value of less than 40, and so forth.

In response to determining that the signal strength and link quality metrics for the wireless speaker device are not satisfied, audio data is not routed to the wireless speaker device (act 514). Audio data may continue to be routed to another speaker device (e.g., an internal speaker of the electronic device).

Returning to act 512, in response to determining that the signal strength and link quality metrics for the wireless speaker device are satisfied, the wireless speaker device is set as the active speaker device for audio routing (act 516). The electronic device proceeds to communicate wirelessly with the wireless speaker device (act 518), routing audio data to the wireless speaker device. In this situation, the electronic device ceases routing audio data to any previously active speaker device for audio routing, effectively switching routing of the audio data from the previously active speaker device to the new active speaker device. However, in one or more embodiments the previously active speaker device remains connected to the electronic device despite audio data not being routed to the previously active speaker device.

Returning to act 510, in response to determining that the electronic device is currently connected to an additional wireless speaker device, the signal strength and link quality metrics of both the speaker devices are evaluated (act 520). These speaker devices are the wireless speaker device for which the connection request was received in act 502 and the additional wireless speaker device in act 510. A determination is made as to whether signal strength and link quality metrics for the newly connected speaker device is satisfied (act 522). This determination is made for the newly connected speaker device analogous to the discussion above in act 512. The newly connected speaker device refers to the speaker device for which a connection request was most recently received (e.g., not the additional speaker device in act 510).

In response to determining that the signal strength and link quality metrics for the newly connected speaker device is not satisfied, audio data is not routed to the newly connected speaker device (act 514). Rather, audio data continues to be routed to another speaker device (e.g., an internal speaker of the electronic device or the additional wireless speaker device in act 510).

However, in response to determining that the signal strength and link quality metrics for the newly connected speaker device is satisfied, the newly connected speaker device is set as the active speaker device for audio routing (act 516). The electronic device proceeds to wirelessly route audio data to the newly connected speaker device (act 518). In this situation, the electronic device ceases routing audio data to any previously active speaker device for audio routing (e.g., the additional wireless speaker device in act 510), effectively switching routing of the audio data from the previously active speaker device to the new active speaker device. However, in one or more embodiments the previously active speaker device remains connected to the electronic device despite audio data not being routed to the previously active speaker device.

Thus, in process 500 connection prompts need not be presented to the user. Rather, in situations in which the audio routing determination system 120 determines whether, based on the signal strength and link quality metrics between the electronic device and a newly connected speaker device, the newly connected speaker device is to be the active device for audio data routing without need for prompting the user.

In the discussion of FIGS. 5A and 5B, various references are made to decisions being made automatically, such as in acts 516 and 514. Additionally or alternatively, rather than making such decisions automatically a user of the electronic device can be prompted to make the newly connected wireless speaker device the active speaker device. The speaker device activation prompt identifies the speaker device and allows the user to select whether to activate or not activate the newly connected speaker device. The user selection can be made in any of a variety of different manners, such as selection of a displayed button or link, input of a gesture (e.g., on a touchscreen display), voice input, and so forth. The newly connected wireless speaker device can be made the active speaker device (e.g., in response to user input indicating to activate the wireless speaker device) or not made the active speaker device (e.g., in response to user input indicating not to activate the speaker device or in response to the speaker device activation prompt being ignored by the user).

Furthermore, various references are made herein to connecting to a speaker device and routing audio data to the speaker device. It is to be appreciated that the techniques discussed herein can be analogously applied to other types of devices and routing other types of data. For example, a connection prompt to connect to a wireless display device may be presented to the user, allowing the user to select whether to connect to the wireless display device and route video data to the wireless display device.

Additionally, in the discussion of FIGS. 4, 5A, and 5B, reference is made as to checking whether audio playback is active. Additionally or alternatively, this check is optional and need not be performed. For example, process 400 can proceed from act 402 directly to act 410 without checking for and regardless of whether audio playback is active. By way of another example, process 500 can proceed from act 504 directly to act 510 without checking for and regardless of whether audio playback is active (although no audio data may be available for routing to the wireless speaker device in act 518).

Figure 6:
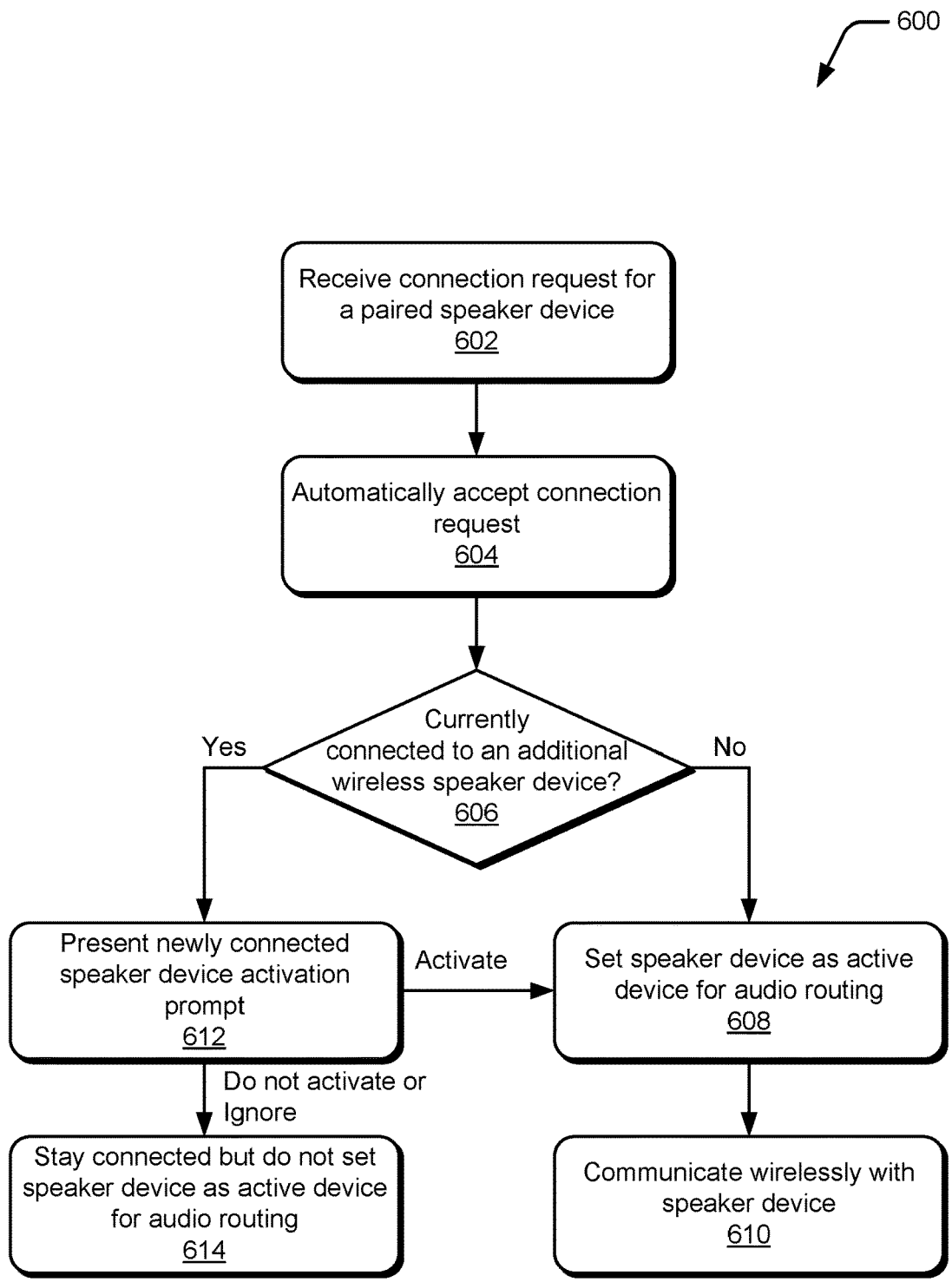
FIG. 6 illustrates another example process for implementing the techniques discussed herein in accordance with one or more embodiments.

FIG. 6 illustrates another example process 600 for implementing the techniques discussed herein in accordance with one or more embodiments. Process 600 is carried out by a system of an electronic device, such as audio routing determination system 120 of FIG. 1 or FIG. 2, and can be implemented in software, firmware, hardware, or combinations thereof. Process 600 is shown as a set of acts and is not limited to the order shown for performing the operations of the various acts.

In process 600, a connection request for a paired speaker device is received (act 602). The request to connect can have been initiated by either the electronic device or the paired speaker device. In one or more embodiments, the first speaker device has been previously paired with the electronic device.

In response to the connection request, the connection request is automatically accepted (act 604). This acceptance includes establishing a communication channel between the electronic device and the speaker device. Although connected, the electronic device does not yet automatically begin routing audio data to the speaker device.

A check is made as to whether the electronic device is currently connected to an additional wireless speaker device (act 606). In one or more embodiments, this check in act 606 is a check as to whether the electronic device is currently connected to any previously paired wireless speaker device that is set as the active device to which audio data is routed (in one or more embodiments regardless of whether audio playback is active). Additionally or alternatively, the speaker device may be another speaker device, such as an internal speaker device of the electronic device.

In response to determining that the electronic device is not currently connected to an additional speaker device, the speaker device is set as the active speaker device for audio routing (act 608). The electronic device proceeds to communicate wirelessly with the speaker device (act 610). This communication includes routing audio data for audio playback from the electronic device to the speaker device. The electronic device continues to communicate wirelessly with the speaker device in act 610 until any of various connection termination events occur, such as audio data being routed to a different speaker device, the speaker device or electronic device being powered off, one or both of the speaker device and the electronic device being moved so as to no longer be in wireless communication range, the speaker device being disconnected from the electronic device, and so forth.

Returning to act 606, in response to determining that the electronic device is currently connected to an additional speaker device, a newly connected speaker device activation prompt is displayed or otherwise presented (act 612). The newly connected speaker device refers to the speaker device for which a connection request was most recently received (e.g., not the additional speaker device in act 606). The newly connected speaker device activation prompt identifies the newly connected speaker device and allows the user to select whether to activate or not activate the newly connected speaker device. The user selection can be made in any of a variety of different manners, such as selection of a displayed button or link, input of a gesture (e.g., on a touchscreen display), voice input, and so forth.

In response to user input selecting to activate the newly connected speaker device, the newly connected speaker device is set as the active speaker device for audio routing (act 608) and the electronic device proceeds to communicate wirelessly with the newly connected speaker device (act 610). In this situation, the electronic device ceases routing audio data to any previously active speaker device for audio routing, effectively switching routing of the audio data from the previously active speaker device to the new active speaker device. However, in one or more embodiments the previously active speaker device remains connected to the electronic device despite audio data not being routed to the previously active speaker device.

However, in response to user input selecting to not activate the newly connected speaker device, or the newly connected speaker device activation prompt being ignored by the user, the newly connected speaker device remains connected to the electronic device but the speaker device is not set as the active device for audio routing (act 614). Accordingly, if the user does not provide input to activate the newly connected speaker device, the electronic device remains connected to the speaker device but audio data is not routed to the newly connected speaker device (e.g., audio data remains routed to whatever speaker device audio data was being routed to when the connection request was received in act 602). In one or more embodiments, audio data is not routed to the newly connected speaker device unless another event occurs causing the speaker device to be activated (e.g., manual selection by the user from a settings menu to activate the speaker device).

Although process 600 discusses checking whether the electronic device is currently connected to an additional wireless speaker device, additionally or alternatively such a check need not be performed. For example, the electronic device may always be determined to be connected to a speaker device, whether it be an external wireless speaker device, an internal speaker device of the electronic device, or some other speaker device. Accordingly, in such situations process 600 can proceed from act 604 directly to act 612.

Furthermore, process 600 discusses in response to determining that the electronic device is not currently connected to an additional speaker device, automatically setting the speaker device as the active speaker device for audio routing in act 608. Additionally or alternatively, rather than making this determination automatically a newly connected speaker device activation prompt is displayed or otherwise presented. The newly connected speaker device refers to the speaker device for which a connection request was most recently received (e.g., not the additional speaker device in act 606). The newly connected speaker device activation prompt identifies the newly connected speaker device and allows the user to select whether to activate or not activate the newly connected speaker device. The user selection can be made in any of a variety of different manners, such as selection of a displayed button or link, input of a gesture (e.g., on a touchscreen display), voice input, and so forth. The newly connected speaker device can be made the active speaker device (e.g., in response to user input indicating to activate the newly connected speaker device) or not made the active speaker device (e.g., in response to user input indicating not to activate the newly connected speaker device or in response to the newly connected speaker device activation prompt being ignored by the user).

In one or more embodiments, along with displaying or otherwise presenting a newly connected speaker device activation prompt, an expiration timer is set (e.g., five or ten seconds). If the timer expires and no response to the newly connected speaker device activation prompt is received, a default action is taken. For example, the default action can be to make the newly connected speaker device the active speaker device (e.g., effectively treat the user ignoring the prompt as indicating to activate the newly connected speaker device). This expiration timer can optionally be enabled or disabled, such as via user preference settings, by an administrator of the electronic device 102, and so forth. If the expiration timer is disabled, the expiration timer need not be set and the newly connected speaker device is not made the active speaker device in response to the newly connected speaker device activation prompt being ignored by the user. Nonetheless, display or other presentation of the newly connected speaker device activation prompt (or any other prompts discussed herein) optionally ceases if no response to the prompt is received within a threshold amount of time (e.g., 10 or 15 seconds).

Using the techniques discussed in process 600, a record of rejected speaker devices need not be maintained and a determination of when to clear a marking of rejected for a speaker device need not be made. Furthermore, by maintaining a connection to the speaker devices, switching between which speaker device audio data is routed to can be performed quicker. Switching from routing audio data to one connected speaker device to another connected speaker device can be performed in response to various events. For example, a user input requesting a switch may be received, in response to which the electronic device displays or otherwise presents a prompt for the user to select one of the connected speaker devices to route audio data to. By way of another example, in response to a speaker device to which audio data is currently being routed being powered off, being moved so as to no longer be in wireless communication range with the electronic device, or being disconnected from the electronic device, the electronic device displays or otherwise presents a prompt for the user to select one of the connected speaker devices to route audio data to.

Figure 7:
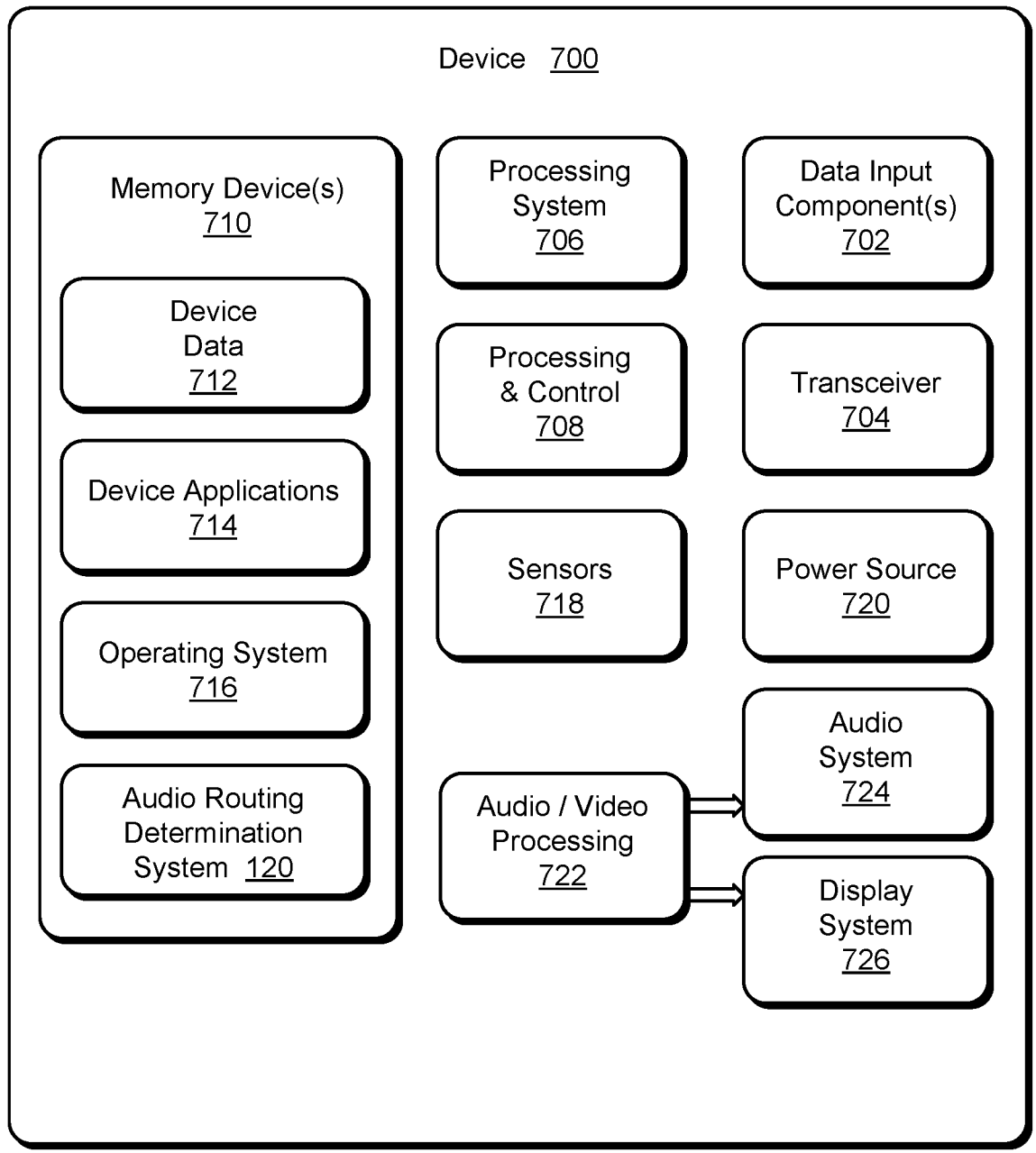
FIG. 7 illustrates various components of an example electronic device that can implement embodiments of the techniques discussed herein.

FIG. 7 illustrates various components of an example electronic device in which embodiments of audio routing determination for speaker devices can be implemented. The electronic device 700 can be implemented as any of the devices described with reference to the previous FIG.s, such as any type of client device, mobile phone, tablet, computing, communication, entertainment, gaming, media playback, or other type of electronic device. In one or more embodiments the electronic device 700 includes the audio routing determination system 120, described above.

The electronic device 700 includes one or more data input components 702 via which any type of data, media content, or inputs can be received such as user-selectable inputs, messages, music, television content, recorded video content, and any other type of text, audio, video, or image data received from any content or data source. The data input components 702 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 702 may also include various other input components such as microphones, touch sensors, touchscreens, keyboards, and so forth.

The device 700 includes communication transceivers 704 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 700 includes a processing system 706 of one or more processors (e.g., any of microprocessors, controllers, and the like) or a processor and memory system implemented as a system-on-chip (SoC) that processes computer-executable instructions. The processing system 706 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 708. The device 700 may further include any type of a system bus or other data and command transfer system that couples the various components within the device. A system bus can include any one or combination of different bus structures and architectures, as well as control and data lines.

The device 700 also includes computer-readable storage memory devices 710 that enable data storage, such as data storage devices that can be accessed by a computing device, and that provide persistent storage of data and executable instructions (e.g., software applications, programs, functions, and the like). Examples of the computer-readable storage memory devices 710 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 710 provides data storage mechanisms to store the device data 712, other types of information or data, and various device applications 714 (e.g., software applications). For example, an operating system 716 can be maintained as software instructions with a memory device and executed by the processing system 706. The device applications 714 may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, thermal sensor, audio sensor (e.g., microphone), and the like. The device 700 can also include one or more power sources 720, such as when the device 700 is implemented as a mobile device. The power sources 720 may include a charging or power system, and can be implemented as a flexible strip battery, a rechargeable battery, a charged super-capacitor, or any other type of active or passive power source.

The device 700 additionally includes an audio or video processing system 722 that generates one or both of audio data for an audio system 724 and display data for a display system 726. In accordance with some embodiments, the audio/video processing system 722 is configured to receive call audio data from the transceiver 704 and communicate the call audio data to the audio system 724 for playback at the device 700. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for audio routing determination for speaker devices have been described in language specific to features or methods, the subject of the appended claims is not necessarily limited to the specific features or methods described. Rather, the specific features and methods are disclosed as example implementations of techniques for implementing audio routing determination for speaker devices. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: receiving, at an electronic device, a wireless connection request to connect a speaker device to an electronic device, the speaker device having been paired with the electronic device; determining whether audio playback at the electronic device is currently active; presenting, in response to the wireless connection request and determining that audio playback at the electronic device is currently active, a connection prompt; accepting, in response to a user input indicating acceptance to the connection prompt, the wireless connection request; and routing, in response to accepting the wireless connection request, audio data for the audio playback wirelessly to the speaker device.

Alternatively or in addition to the above described or recited method, any one or combination of the following. Wherein the wireless connection request comprises a Bluetooth connection request. Wherein the presenting the connection prompt includes: displaying a visible connection prompt on a display of the electronic device; and presenting haptic feedback at the electronic device indicating the visible connection prompt is displayed on the electronic device. The method further comprising ignoring, in response to a user input to the connection prompt indicating to ignore the wireless connection request, the wireless connection request by not responding to the wireless connection request. The method further comprising continuing to route, in response to the user input to the connection prompt indicating to ignore the wireless connection request, the audio data for the audio playback to a speaker device internal to the electronic device. The method further comprising: marking, in response to a user input to the connection prompt indicating to reject the wireless connection request, the speaker device as rejected; and ignoring the wireless connection request by not responding to the wireless connection request. The method further comprising: determining that audio playback at the electronic device is no longer currently active; and clearing, in response to audio playback at the electronic device no longer being currently active, the marking of the speaker device as rejected. The method further comprising: receiving a subsequent wireless connection request from the speaker device; checking whether the speaker device has been previously marked as rejected; and presenting the connection prompt only if the speaker device has not been previously marked as rejected. The method further comprising ignoring, in response to the speaker device having been previously marked as rejected, the wireless connection request by not responding to the wireless connection request. The method further comprising automatically accepting, in response to determining that audio playback at the electronic device is not currently active, the wireless connection request.

A method comprising: establishing, by an electronic device, a wireless connection with a first wireless speaker device paired with the electronic device; determining whether audio playback at the electronic device is currently active; determining whether the electronic device is currently connected to a second wireless speaker device; determining, in response to the electronic device not being currently connected to a second wireless speaker device, whether signal strength and link quality metrics for the first wireless speaker device are satisfied; automatically setting, in response to the signal strength and link quality metrics for the first wireless speaker device being satisfied, the first wireless speaker device to be the active speaker device; and routing audio data for the audio playback wirelessly to the first wireless speaker device.

Alternatively or in addition to the above described or recited method, any one or combination of the following. The method further comprising in response to the signal strength and link quality metrics for the first wireless speaker device not being satisfied, not routing audio data to the first wireless speaker device. The method further comprising, in response to the electronic device being currently connected to the second wireless speaker device: evaluating the signal strength and link quality metrics for the second wireless speaker device and signal strength and link quality metrics for the first wireless speaker device; determining whether the signal strength and link quality metrics for both the first wireless speaker device and the second wireless speaker device are satisfied; automatically setting the first wireless speaker device to be the active speaker device; and routing audio data for the audio playback wirelessly to the first wireless speaker device. The method further comprising, in response to the electronic device being currently connected to the second wireless speaker device: evaluating the signal strength and link quality metrics for the second wireless speaker device and signal strength and link quality metrics for the first wireless speaker device; determining whether the signal strength and link quality metrics for both the first wireless speaker device and the second wireless speaker device are satisfied; and ignoring, in response to the signal strength and link quality metrics for both the first wireless speaker device and the second wireless speaker device not being satisfied, not routing audio data to the first wireless speaker device.

An electronic device comprising: a processor implemented in hardware; and a computer-readable storage medium having stored thereon multiple instructions that, responsive to execution by the processor, cause the processor to perform acts including: receiving, at the electronic device, a wireless connection request to connect a first speaker device to the electronic device, the first speaker device having been paired with the electronic device; determining whether the electronic device is currently connected to a second speaker device; presenting, in response to the wireless connection request and determining that the electronic device is currently connected to the second speaker device, a speaker device activation prompt; and routing, in response to a user input to the speaker device activation prompt indicating to activate the first speaker device, audio data for playback wirelessly to the first speaker device.

Alternatively or in addition to the above described or recited electronic device, any one or combination of the following. The acts further comprising accepting the wireless connection request regardless of whether the user input indicates to activate the first speaker device. The acts further comprising: presenting, in response to one or more events, a prompt to activate a third wireless speaker device currently connected to the electronic device; and routing, in response to a user input selecting to activate the third wireless speaker device, audio data for playback wirelessly to the third wireless speaker device, and ceasing routing audio data for playback wirelessly to the first speaker device. The acts further comprising routing, in response to a user input indicating rejection of the speaker device activation prompt, audio data for playback to the second speaker device. The acts further comprising routing, in response to the speaker device activation prompt being ignored by a user, audio data for playback to the second speaker device. The second speaker device being an active device to which audio data is wirelessly routed when the wireless connection request to connect the first speaker device is received.

What is claimed is:

1. A method comprising:
receiving, at an electronic device, a wireless connection request to connect a speaker device to an electronic device, the speaker device having been paired with the electronic device;
determining whether audio playback at the electronic device is currently active;
determining whether a record of a previous connection request to connect the speaker device to the electronic device indicates that the previous connection request was accepted, rejected, or ignored;
presenting, in response to the wireless connection request and determining that audio playback at the electronic device is currently active, a connection prompt based on the record of the previous connection request;
accepting, in response to a user input indicating acceptance to the connection prompt, the wireless connection request; and
routing, in response to accepting the wireless connection request, audio data for the audio playback wirelessly to the speaker device.

2. The method as recited in claim 1, wherein the wireless connection request comprises a Bluetooth connection request.

3. The method as recited in claim 1, wherein the presenting the connection prompt includes:
displaying a visible connection prompt on a display of the electronic device; and
presenting haptic feedback at the electronic device indicating the visible connection prompt is displayed on the electronic device.

4. The method as recited in claim 1, further comprising ignoring, in response to a user input to the connection prompt indicating to ignore the wireless connection request, the wireless connection request by not responding to the wireless connection request.

5. The method as recited in claim 4, further comprising continuing to route, in response to the user input to the connection prompt indicating to ignore the wireless connection request, the audio data for the audio playback to a speaker device internal to the electronic device.

6. The method as recited in claim 1, further comprising:
marking, in response to a user input to the connection prompt indicating to reject the wireless connection request, the speaker device as rejected; and
ignoring the wireless connection request by not responding to the wireless connection request.

7. The method as recited in claim 6, further comprising:
determining that audio playback at the electronic device is no longer currently active; and
clearing, in response to audio playback at the electronic device no longer being currently active, the marking of the speaker device as rejected.

8. The method as recited in claim 1, further comprising:
receiving a subsequent wireless connection request from the speaker device;
checking whether the speaker device has been previously marked as rejected; and
presenting the connection prompt only if the speaker device has not been previously marked as rejected.

9. The method as recited in claim 8, further comprising ignoring, in response to the speaker device having been previously marked as rejected, the wireless connection request by not responding to the wireless connection request.

10. The method as recited in claim 1, further comprising automatically accepting, in response to determining that audio playback at the electronic device is not currently active, the wireless connection request.

11. The method of claim 1, further comprising presenting the connection prompt based on determining whether a threshold amount of time has elapsed since receiving a previous connection request to connect the speaker device to the electronic device.

12. An electronic device comprising:
a processor implemented in hardware; and
a computer-readable storage medium having stored thereon multiple instructions that, responsive to execution by the processor, cause the processor to perform acts including:
receiving a wireless connection request to connect a speaker device to the electronic device;
determining whether audio playback at the electronic device is currently active;
determining whether a record of a previous connection request to connect the speaker device to the electronic device indicates that the previous connection request was accepted, rejected, or ignored;
presenting, in response to the wireless connection request and determining that audio playback at the electronic device is currently active, a connection prompt based on the record of the previous connection request indicating that the previous connection request was accepted;
accepting, in response to a user input indicating acceptance to the connection prompt, the wireless connection request; and
routing, in response to accepting the wireless connection request, audio data for the audio playback wirelessly to the speaker device.

13. The electronic device as recited in claim 12, the acts further including:
marking, in response to a user input to the connection prompt indicating to reject the wireless connection request, the speaker device as rejected; and
ignoring the wireless connection request by not responding to the wireless connection request.

14. The electronic device as recited in claim 13, the acts further including:
determining that audio playback at the electronic device is no longer currently active; and
clearing, in response to audio playback at the electronic device no longer being currently active, the marking of the speaker device as rejected.

15. The electronic device as recited in claim 12, wherein the wireless connection request comprises a Bluetooth connection request.

16. The electronic device as recited in claim 12, wherein the presenting the connection prompt includes:
displaying a visible connection prompt on a display of the electronic device; and
presenting haptic feedback at the electronic device indicating the visible connection prompt is displayed on the electronic device.

17. The electronic device as recited in claim 12, the acts further including:

ignoring, in response to a user input to the connection prompt indicating to ignore the wireless connection request, the wireless connection request by not responding to the wireless connection request; and continuing to route, in response to the user input to the connection prompt indicating to ignore the wireless connection request, the audio data for the audio playback to a speaker device internal to the electronic device.

18. An electronic device comprising:

an audio routing determination system, implemented at least in part in hardware, to:

receive a wireless connection request to connect a speaker device to the electronic device;

determine whether audio playback at the electronic device is currently active;

determine whether a record of a previous connection request to connect the speaker device to the electronic device indicates that the previous connection request was accepted, rejected, or ignored;

present, in response to the wireless connection request and determining that the audio playback at the electronic device is currently active, a connection prompt based on the record of the previous connection request; and accept, in response to a user input indicating acceptance to the connection prompt, the wireless connection request; and a communication system, implemented at least in part in hardware, to route, in response to accepting the wireless connection request, audio data for the audio playback wirelessly to the speaker device.

19. The electronic device as recited in claim 18, wherein the communication system is further to receive a subsequent wireless connection request from the speaker device, check whether the speaker device has been previously marked as rejected, and present the connection prompt only if the speaker device has not been previously marked as rejected.

20. The electronic device as recited in claim 19, wherein the communication system is further to ignore, in response to the speaker device having been previously marked as rejected, the wireless connection request by not responding to the wireless connection request.

* * * * *